Feb. 24, 1959     R. PETERSON     2,874,651
PORTABLE PROTECTING COVER FOR GRAIN IN OPEN FIELD STORAGE
Filed March 4, 1955
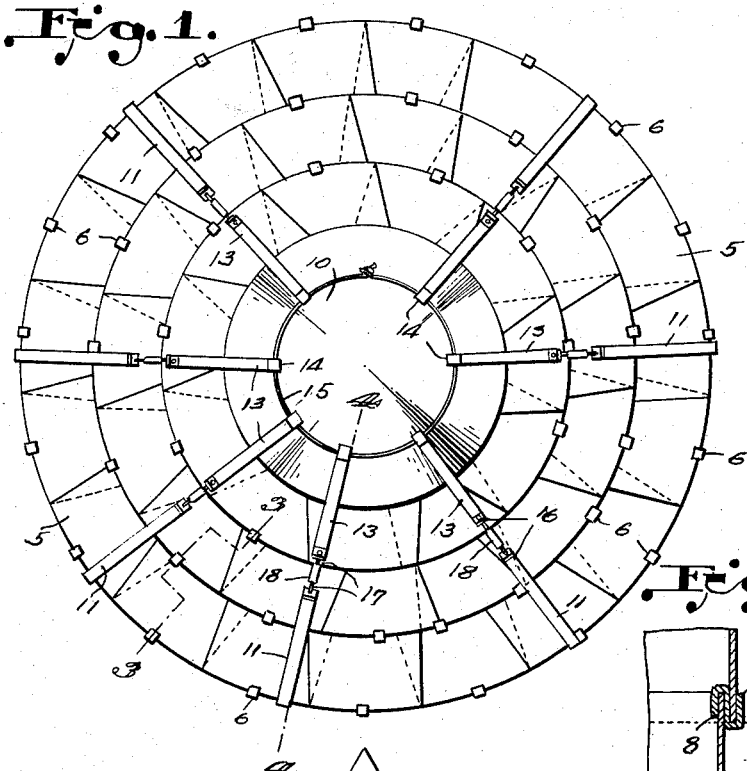
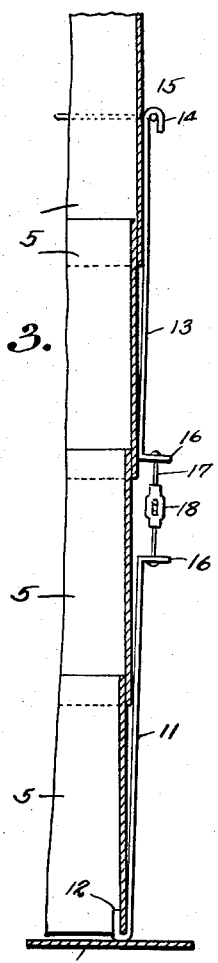
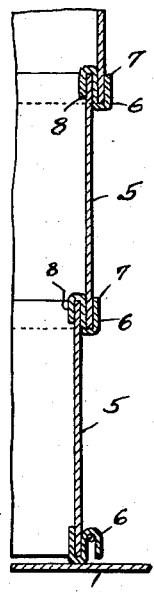
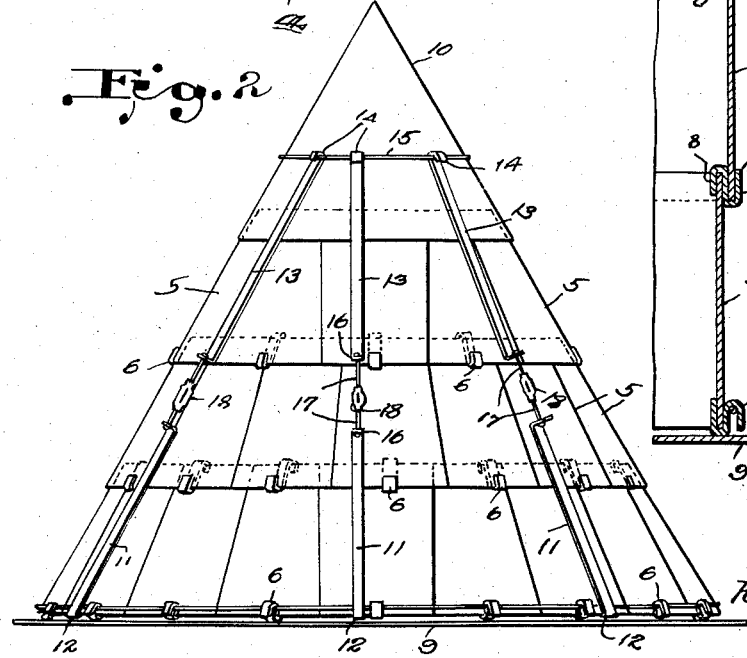
Reuben Peterson
INVENTOR
BY *C. A. Snow & Co.*
ATTORNEYS.

2,874,651

PORTABLE PROTECTING COVER FOR GRAIN IN OPEN FIELD STORAGE

Reuben Peterson, Wessington, S. Dak.

Application March 4, 1955, Serial No. 492,218

1 Claim. (Cl. 108—3)

This invention relates to a protecting cover designed for use in protecting or shielding grain when stored upon the ground in an open field, thereby providing a cover which will protect the grain against damage by the elements.

An important object of the invention is to provide a cover or shield of this character which embodies a plurality of removably connected metal plates, with connecting means for securing the plates together in the formation of a complete protecting cover.

Another object of the invention is to provide a protecting cover which may be readily and easily dismantled to facilitate the storing and transportation of the plates or elements of which the cover is constructed.

Still another object of the invention is to provide a cover constructed of a plurality of plates which when connected in the formation of the cover, will provide a cover which will be exceptionally strong and durable to withstand wind pressure and maintain the grain protected by the cover, in a dry condition at all times.

Other and further objects and advantages of the invention will be hereinafter described and the novel features thereof defined in the appended claim.

Referring to the drawing in detail:

Fig. 1 is a plan view of a cover constructed in accordance with the invention.

Fig. 2 is an elevational view thereof.

Fig. 3 is a sectional view taken on the line 3—3 of Fig. 1.

Fig. 4 is a sectional view taken on the line 4—4 of Fig. 1.

Referring to the drawing in detail, the cover embodies a plurality of identical plates 5 constructed preferably of sheet metal material, the plates 5 being arranged with respect to each other to provide an inverted cone shaped cover, as best shown by Fig. 2 of the drawing.

Clips 6 are provided in connecting the plates at their adjacent edges, the plates being arranged in circular lines with the lower ends of the plates of the adjacent upper circular lines of plates, overlapping the upper edges of the adjacent lower plates, as clearly shown by Fig. 3 of the drawing. With this overlapped relation of the plates, it is obvious that rain or foreign matter will be excluded from the interior of the cover.

As shown, each of these clips comprises a pair of oppositely disposed jaws 7 and 8, which jaws provide hangers to hold the plates of the lines of plates in their proper protecting positions, the weight of the plates holding the over sections assembled.

The cover is erected preferably over a cover sheet 9, the cover sheet being preferably canvas or waterproof building paper or the like to exclude moisture from the grain while on the cover sheet, by capillary attraction.

In addition to the plates 5, an inverted cone shaped cone- section 10 is provided which is formed of a length of sheet metal such as sheet aluminum, galvanized metal or the like. This inverted cone shaped cover section is so designed that it will fit over the uppermost circular line of plates 5 providing a cap for the cover to shed rain or the elements.

In constructing the protecting cover, connecting bars 11 are provided, the connecting bars having hooks 12 at their lower ends, hooked over the lower edges of the lowermost line of plates 5 as is shown by Fig. 4 of the drawing.

Upper connecting bars 13 cooperate with the connecting bars 11, and have their hooked ends 14 hooked over the ring 15 constructed of wire material, which is of a diameter to fit a substantial distance over the cover or cap section 10. The adjacent ends of the connecting bars 11 and 13 are extended laterally at 16, which laterally extended portions are formed with openings to receive the rods 17 of turn buckles 18 so that the connecting bars 12 and 13 may be drawn taut drawing the plates of the cover together in the formation of the cover proper.

In assembling the cover, a row of clips 6 are provided at the base of the cover and are hooked over the lower edges of the plates of the lowermost circular line of plates. The clips 6 at the bottom of the cover proper held the lower ring 19 at the base of the protecting cover against spreading when positioned over grain piled in an open area.

The hooked ends 14 of the connecting bars 13 are now hooked over the wire ring 15, and the turn buckles 18 connected between the laterally extended ends 16 of the connecting bars, are rotated to draw the connecting bars 11 and 13 towards each other, tightening them against the rings with which they are connected to secure the plates 5 in their assembled positions, forcing the lower ends of the plates into the clips associated therewith.

When it is desired to disassemble the cover, it is of course obvious that the turn buckles 18 will be rotated in a reverse direction leaving the tension on the plates and permitting the plates to be disconnected.

It will be also seen that due to the construction of the cover invented by applicant, a quantity of grain may be stored in an open field and supplied with a cover to protect the grain against the elements.

It will also be noted that because of the construction of the cover, the cover may be made in various sizes to protect various quantities of grain.

While the specific details of one embodiment of this invention have been herein shown and described, the invention is not confined thereto as changes and alterations may be made without departing from the spirit and scope thereof as defined in the appended claim.

I claim:

A grain protecting cover comprising a plurality of lower plates disposed in upward convergent relation with their adjacent edges disposed in overlapping relation, said plates being transversely curved, intermediate superposed tiers of curved upwardly convergent plates, clips secured between the plates of adjacent tiers, lower clips secured to the lower edges of said lower plates, a lower ring engaged with said lower clips, an upper cone telescoping over the upper ends of the plates of the upper tier of plates, a ring about said cone disposed at a point intermediate the ends thereof, aligned pairs of connecting bars, each pair of connecting bars being formed with upper and lower hooks, said upper hooks engageable with said upper ring, said lower hooks engageable with the lower edges of said lower plates, right-angularly disposed lugs extending from the confronting ends of said bars, and a turnbuckle connected between each pair of lugs, adapted to draw said connected bars towards each other moving said ring on said cone downwardly over the lower enlarged base of said cone, removably securing said plates of the cover together.

(References on following page)

References Cited in the file of this patent

UNITED STATES PATENTS

| | | |
|---|---|---|
| 480,859 | Rice | Aug. 16, 1892 |
| 950,684 | Van Dusen | Mar. 1, 1910 |
| 974,233 | Brewer | Nov. 1, 1910 |
| 1,137,689 | Allsteadt | Apr. 27, 1915 |
| 1,311,116 | Fitch | July 22, 1919 |
| 2,306,537 | Hamm | Dec. 29, 1942 |

FOREIGN PATENTS

| | | |
|---|---|---|
| 321,005 | Great Britain | Oct. 31, 1929 |
| 541,280 | Great Britain | Nov. 20, 1941 |
| 688,273 | France | May 12, 1930 |